Aug. 22, 1961  W. L. GSCHING ET AL  2,997,144
TRANSMISSION AND BRAKING ARRANGEMENT
Filed March 18, 1957  4 Sheets-Sheet 1

INVENTORS:
Wilhelm Ludwig Gsching
Willy W. Lieb
BY

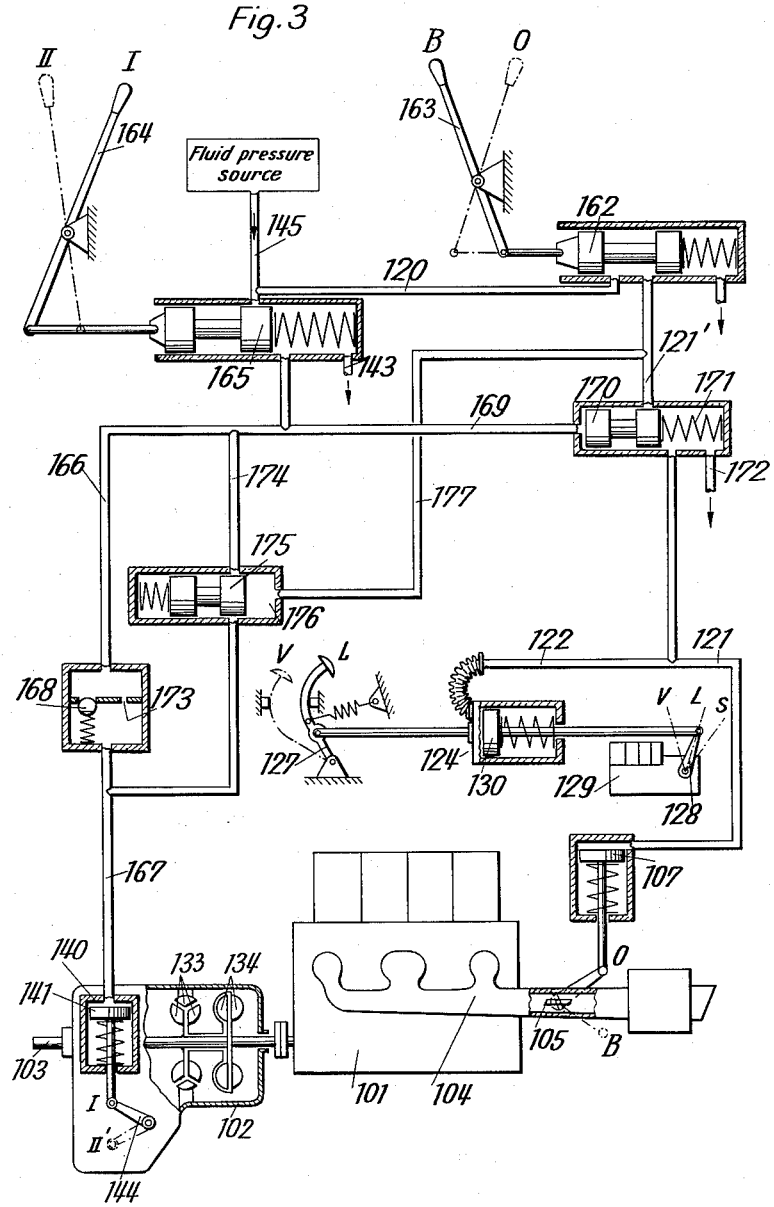

United States Patent Office 2,997,144
Patented Aug. 22, 1961

2,997,144
TRANSMISSION AND BRAKING ARRANGEMENT
Wilhelm Ludwig Gsching, Heidenheim (Brenz), and Willy Walter Lieb, Hamburg, Germany, assignors to J. M. Voith G.m.b.H., Maschinenfabrik, Heidenheim, Germany
Filed Mar. 18, 1957, Ser. No. 646,762
Claims priority, application Germany Mar. 21, 1956
12 Claims. (Cl. 192—4)

The present invention relates to a brake arrangement and, more specifically, to a brake arrangement with exhaust throttle for use in connection with an internal combustion engine equipped with a hydraulic transmission, especially for motor vehicle drives.

With internal combustion engines equipped with a mechanical power transmission, it is known to brake by means of the engine when the latter is running idle. An increase in the motor braking effect can be obtained by braking by means of a throttle in the exhaust. This type of breaking is also known under the name exhaust braking. To this end, the exhaust conduit of the internal combustion engine is closed by a throttle, and the supply of fuel to the engine is interrupted which means that even the small quantity of fuel ordinarily supplied to the engine during idling thereof—the idling charge—is not fed to the engine any longer. The engine then works as compressor so that its compression work as well as all friction losses will produce a braking effect.

If the power transmission of the engine output is effected through a hydraulic transmission with a customarily lower torque converter working range and an upper mechanical working range, a motor braking effect can be obtained only in said mechanical working range. This is due to the fact that when working in the torque converter working range, the motor will not be driven by the output shaft for instance by the driving axle of the vehicle. Thus, there exists the deficiency that when the throttle brake is made effective within the torque converter velocity range, the engine will die due to the fact that the motor shaft will not be driven by the output shaft i.e. by the pushing vehicle or the like, or at least the drive of the motor shaft by the output shaft will be too small, in addition to the fact that the idling charge is likewise lacking. Consequently, if prior to the shifting of the transmission to torque converter operaton, the operator of the vehicle does not make the exhaust brake ineffective in time, dangerous situations can be encountered due to the stoppage of the motor, particularly when driving down steep hills.

It is, therefore, an object of the present invention to provide a brake arrangement which will allow exhaust braking without encountering the above mentioned drawbacks.

It is another object of this invention to provide an exhaust brake arrangement, in which the exhaust brake which may be actuated whenever desired will automatically be made ineffective below a certain condition of operation which is not lower than the lowest shifting point from the upper working range to the lower working range pertaining to the torque converter.

It is a further object of this invention to provide an exhaust brake arrangement of the type set forth above which will also be highly effective and reliable in connection with internal combustion engines which are difficult to start or have the tendency to die during the starting period.

It is still another object of this invention to provide an exhaust brake arrangement of the type set forth in the preceding paragraphs which is relatively simple in construction and operation, thereby increasing the safety of operation of the vehicle equipped with such exhaust brake arrangement.

These and other objects and advantages of the invention will appear more clearly from the following specification in connection with the accompanying drawings, in which:

FIG. 3 is a diagrammatic illustration of an exhaust brake arrangement according to the invention which is modified over that of FIG. 1 in so far as it comprises a delayed action mechanism for the control or switch-over of the transmission and also comprises a hydraulic coupling for the upper velocity range.

General arrangement

Figure 1:
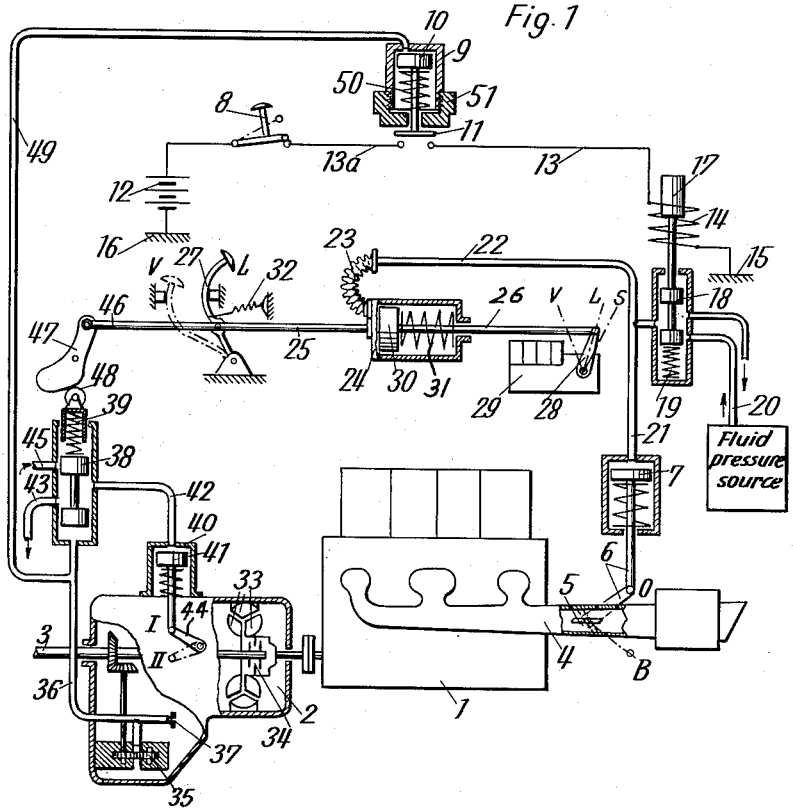
FIG. 1 is a diagrammatic illustration of the outline of an exhaust pipe brake arrangement for a diesel engine driven vehicle in which the hydraulic transmission as well as the safety mechanism for the exhaust pipe brake is controlled in conformity with the vehicle speed.

The exhaust brake arrangement according to the present invention is particularly intended for internal combustion engines which have a hydraulic transmission with a lower partially or fully hydraulic torque converter working range, and which also have an upper working range with mechanical power transmission or hydraulic coupling. The exhaust brake arrangement according to the invention is characterized primarily by a safety mechanism which will always automatically keep the exhaust brake ineffective below a certain condition or point of operation which is lower than the lowest switch-over point from the upper working range to the lower working range of the transmission. According to one embodiment of the present invention, the safety mechanism is controlled by the control of the hydraulic transmission. If the hydraulic transmission is designed for automatic shift-over in conformity with the output speed, the safety mechanism according to the invention may also be controlled by the output speed. In connection therewith, a speed measuring pump driven by an output shaft of the drive is advantageously employed in such a manner that the pressure developed by said pump controls the safety mechanism. With fluid transmissions equipped with a secondarily driven speed measuring pump for controlling the transmission, such pump may simultaneously be used for controlling the safety mechanism according to the invention. It is also possible instead of said measuring pump to provide a speed measuring generator and to control the safety mechanism according to the invention by the voltage of said generator which increases with the increase in the speed.

Internal combustion engines which are difficult to start may in spite of the safety mechanism according to the invention die under certain circumstances namely if the exhaust brake is made effective only at the switch-over point of the transmission from the upper to the lower working range. In other words, the charge for the engine would be somewhat too late. For drives intended for such internal combustion engines which are difficult to start, the safety mechanism according to the invention is so designed that the exhaust brake will be made effective below a point of operation which is somewhat higher than the lowermost shift-over point, i.e. the lowest shift-over speed.

With another form of brake arrangement, the safety mechanism according to the present invention and controlled by the transmission shifting operation is so designed that the transmission shift-over impulse to the lower working range which may be produced when desired or automatically, first and immediately makes the exhaust brake ineffective whereas the transmission shift-over is made effective only shortly after the exhaust brake has become ineffective. Also in this instance, it is assured that the exhaust brake will be made ineffective prior to the downward shift of the torque converter working range so that the internal combustion engine will not die. When drives with a mechanical upper velocity range are involved and if vehicles are concerned which have to be braked quickly, the time interval for the delay in the downward shift of the transmission must be kept in such limits that within the upper velocity range during the delay in the downward shifting of the transmission, the vehicle will be braked only down to such a minimum speed and motor speed at which the motor will not yet die.

*Structural arrangement*

Referring now to the drawings in detail and FIG. 1 thereof in particular, the arrangement shown therein comprises a diesel engine 1 adapted through the fluid transmission 2 and the output shaft 3 thereof to drive the driving wheels (not shown) of a vehicle, for instance of a truck. In order to obtain an increased motor braking effect, a throttle 5 is arranged in the exhaust pipe 4 of the diesel engine, said throttle 5 being adapted to be adjusted through a link system 6 and a brake control piston 7 connected thereto. The throttle 5 in the exhaust pipe 4 may also be called exhaust pipe brake. For making the exhaust pipe brake effective at random, there is provided an electric foot operable switch 8 movable selectively into the position B which represents the braking position or into the position O which represents the non-braking position. The automatically effective electric oil pressure switch 9 which will be described in detail further below is always effective at high driving speed, i.e. occupies its closing position. In the effective position of the switch 9, its contact member 11 occupies its lowermost position in which it bridges the lines 13 and 13a. As soon as both switches 8 and 9 have been made effective, the switch 8 at random and the switch 9 automatically, the circuit of the battery 12 is closed through conduits 13a, 13, coil 14 and ground connections 15 and 16. When the said circuit is closed, the iron core or armature 17 is pulled into the coil 14 and against the thrust of spring 19 moves the brake control spool 18 downwardly, said spool 18 being connected to the armature 17. When the spool 18 occupies its lower position, pressure fluid from a pressure fluid source passes through conduit 20 into conduit 21 where it acts upon the brake control piston 7 so that the latter will be moved downwardly. As a result thereof, the linkage system 6 tilts the throttle 5 from its opening position O into its throttling or closing position B in which the exhaust pipe is closed. At the same time, pressure fluid entering the conduit 20 passes through conduit 22 and the flexible hose connection 23 to the displaceable cylinder 24 which is interposed between the connecting rods 25 and 26 between the accelerator 27 and the fuel lever 28 of the fuel injection pump 29 of the diesel engine, cylinder 24 being connected to connecting rod 25. Inasmuch as during the braking operation, the accelerator is always returned into its idling position L, it will be apparent that under normal circumstances the fuel control lever 28 would likewise occupy its idling position L so that the motor would be fed the respective fuel charge for idling. Due to the supply of pressure fluid through conduits 22 and 23, the piston 30 is against the thrust of the spring 31 moved further toward the right whereby the fuel control lever 28 turns into the stopping position S which corresponds to the fuel supply zero. In this way, then making the exhaust pipe brake effective, the exhaust pipe throttle 5 is closed and the fuel supply is automatically adjusted from idling charge to zero. It is, of course, understood that the spring 31 is weaker than the return spring 32 for the accelerator so that the pressure fluid fed to the displaceable cylinder 24 will always adjust the fuel control lever 28 through piston 30 and rod 26 connected thereto and to lever 28 but under no circumstances will adjust the accelerator 27.

The transmission has two working ranges. Within the lower working range, the motor torque is hydraulically conveyed through the hydraulic torque converter 33, whereas in the upper working range it is conveyed purely mechanically through the friction clutch 34. The control of the transmission is effected in conformity with the vehicle speed and the fuel charge for the engine, and among others comprises a measuring pump 35 driven by the output shaft 3, and a throttle 37 connected to the pressure conduit 36 of said pump 35. The pressure in the conduit 36 increases with the speed of the pump according to an equation representing a parabola. In other words, the pressure in conduit 36 is an indication for the driving speed of the vehicle and actuates the control spool 38. At low measuring pump pressure, i.e. at low driving speed, the control spool 38 is, due to the spring 39, in its lowermost position shown in FIG. 1, in which the spool vents the pressure chamber 40 at the transmission control piston 41 through the conduits 42 and 43. The lever 44 connected to the transmission control piston 41 will then occupy its full line position I for the lower velocity range in which by means of control elements (not shown) the torque converter is made effective. At a driving speed corresponding to the transmission shift-over point, the measuring pump pressure in the pressure conduit 36 is so high that it moves the spool 38 against the thrust of spring 39 into its upper end position in which the pressure supply conduit 45 communicates through conduit 42 with the pressure chamber 40 at the transmission control piston 41. It will be obvious that now the piston 41 moves downwardly moving the lever 44 into the dot-dash line position II in which the torque converter is made ineffective, while the friction clutch 34 is made effective for the upper mechanical velocity range. The control elements operated by lever 44, but not shown here in detail, for the switching on and off of the fluid converter 33 and of the friction coupling 34, may be designed on any known principle, for instance similar to the control elements shown in FIGURE 6 of the U.S. Patent Specification 1,298,990, which control elements are also used for the control of a fluid converter and a direct coupling.

With the embodiment illustrated in FIG. 1, the transmission shift-over point is, as frequently customary, in addition to being dependent on the driving speed also dependent on the position of the accelerator. It will be understood that when adjusting the accelerator 27, through the intervention of the rod 46, the cam 47 and roller 48, the thrust of spring 39 is changed in such a manner that the transmission shift-over operation at partial or full charge position of the accelerator is effected at correspondingly higher output speeds than is the case at idling position of the accelerator as will be more clearly explained later in connection with the description of the graph of FIG. 2.

The safety mechanism according to the present invention consists primarily of a branch conduit 49 branching off from the measuring pump pressure conduit 36, and the above mentioned electric oil pressure switch 9 with pressure piston 10, pressure spring 50 and contact member 11. The thrust of spring 50 and the cross sectional area of the piston 10 are with regard to the measuring pump pressures so dimensioned that the oil pressure switch will always be opened or made ineffective below a measuring pump pressure and thus below a vehicle driving speed which is somewhat higher than the values corresponding to the transmission shift-over point with idling engine. By adjusting the nut 51 it is possible to vary the thrust of the spring 50 and thereby the point at which the oil pressure switch becomes effective.

Figure 2:
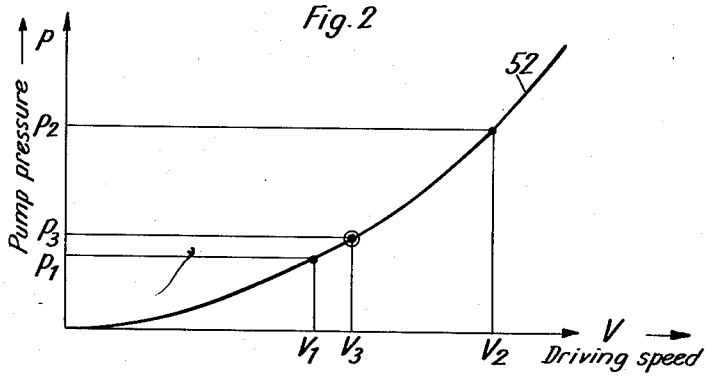
FIG. 2 represents a graph of the performance of the braking arrangement according to FIG. 1 and, in conformity with the vehicle speed, illustrates the secondary measuring pump pressure as well as the control pressures for the fluid transmissions and the safety arrangement according to the invention.

Reference may not be had to FIG. 2 showing plotted on the abscissa the driving speed V of the vehicle drive of FIG. 1 while the ordinate has plotted thereon the pressures $p$ of the secondary measuring pump 35. In other words, parabola-like increasing graph 52 indicates the pressure $p$ of the secondary measuring pump 35 in conformity with the driving speeds V. The value $V_1$ corresponds to the driving speed at the lowermost transmission shiftover point, i.e. at the shift-over point at idling speed of the engine. $p_1$ represents the corresponding measuring pump pressure. With increasing fuel charge, the transmission shift-over point becomes coordinated with higher driving speeds. With full charge, or fuel throttle completely open (accelerator position V), the transmission shift-over is effected at $V_2$, $p_2$. The operational values $V_3$ and $p_3$ correspond to the shifting point of the oil pressure switch 9. Below these values, the oil pressure switch is always in its ineffective position so that the exhaust pipe brake movable at random will be ineffective. The small intermediate range between the making of the exhaust pipe brake ineffective (at $V_3$, $p_3$), and the return shifting of the fluid transmission (at $V_1$, $p_1$) is sufficient to assure that the internal combustion engine will again receive its idling speed charge and will work properly before the torque converter range of the transmission again becomes effective. A stalling of the engine is thus safely avoided.

Figure 1B:
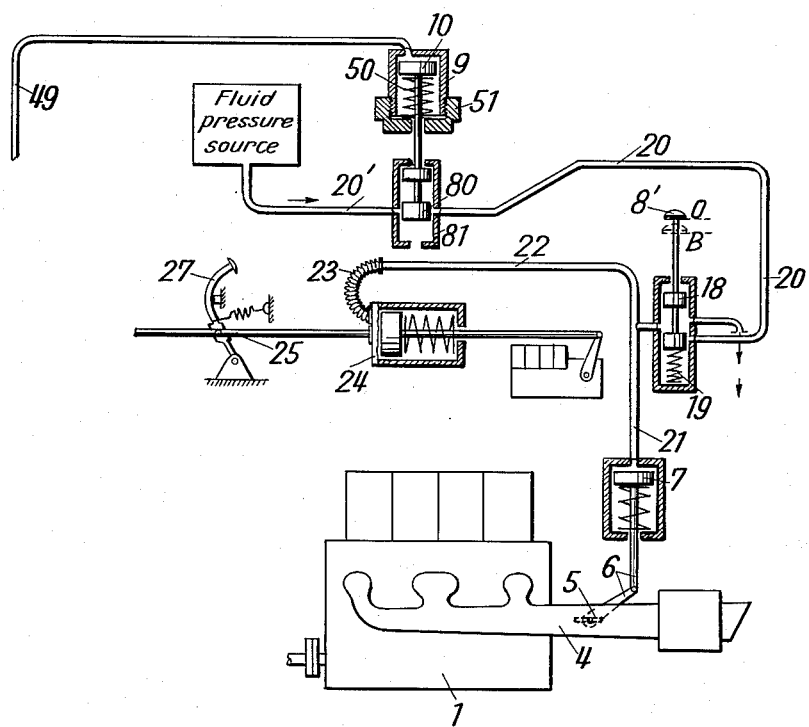
FIGURE 1b shows a brake arrangement which is somewhat modified over that of FIG. 1.

The safety arrangement according to the invention may also be modified according to FIGURE 1b and may be designed without electric circuit. In this case the brake control valve 18 is operated directly by the foot switch 8' (brake foot switch). Further, in this case, piston 10 of oil pressure switch 9 is connected to a control piston 80 of a valve 81 inserted in the supply line 20'—20 said supply line being connected to a fluid pressure source 82. Below the driving speed $V_3$ this control piston 80 cuts off the flow of the pressure medium through line 20'—20 and prevents the exhaust brake from becoming effective. When the driving speed has attained the value $V_3$, control piston 80 disengages the line 20'—20, so that by pressing foot switch 8' down, the exhaust brake can be brought into action. The remaining parts of this arrangement, with respect to design and operation, correspond to those shown in FIG. 1 and are designated with the same reference numerals.

Referring now to the arrangement of FIG. 3, the structural elements thereof which correspond to those of FIG. 1 have been designated with the same reference numerals as in FIG. 1 but increased by one hundred. In this arrangement the exhaust pipe throttle 105 of the diesel engine 101 is likewise adjustable by a brake control piston 107. The supply of pressure fluid to said brake control piston and to the cylinder 124 is effected through the supply conduit 120 through conduits 121' and 121 and 122 and is adapted to be controlled by the valve spool 162 and the manually operable brake lever 163. The cylinder 124, similar to the cylinder 24 of FIG. 1, serves for adjustment of the fuel control lever 128 to zero charge position.

The hydraulic transmission 102 which follows the engine comprises a torque converter 133 for the lower driving range and a hydraulic coupling 134 for the upper driving range. The manually operable transmission shift lever 164 makes it possible to shift the transmission over at random. When the lever 164 occupies its dot-dash line position II, the upper velocity range is made effective while the valve spool 165 occupies its right-hand end position (not shown in the drawing), in which it allows the pressure fluid to flow from the conduit 145 into the conduit 166 and from there through the now opening check valve 168 and conduit 167 into the transmission shifting cylinder 140 comprising the piston 141. This piston 141 and the lever 144 then move into their lowermost position II' in which the torque converter empties, whereas the hydraulic coupling 134 is being filled. The hydraulic coupling 134 is adapted at the high speeds of rotation of the upper velocity range to convey a sufficiently high torque in both directions of power flow and thereby makes it possible to brake by the engine, while a killing of the engine is prevented. The filling and emptying of the fluid converter and of the fluid coupling can be achieved by well known means, for instance by an arrangement as described in detail in our older U.S. patent specification 2,067,793 in connection with FIG. 6 of this patent specification.

When shifting the transmission to the upper velocity range, simultaneously a fluid pressure acts through conduit 169 upon the spool 170 so as to move the same from its left-hand position with regard to FIG. 3 into its right-hand position in which the control conduits 121', 121 and 122 which were blocked up to that time will be released. Only now is it possible actually to brake by means of the exhaust pipe throttle 105. After tilting the braking lever 163 from its position O into the braking position B, the valve spool 162 will occupy its illustrated right-hand position so as to allow the passage of pressure fluid from conduit 145 through conduit 120, conduit 121', 121 and 122 to the brake control piston 107 and cylinder 124. As a result thereof, the exhaust pipe throttle 105 will be closed, i.e. moved into the position B, and the control lever 128 for the control of the fuel charge to the motor will move into the position S (no or zero charge of the motor). The exhaust pipe brake will thus be effective.

As soon as the transmission control lever 164 is moved back into its full line position I, the conduits 166 and 169 communicate with the venting conduit 143, thereby releasing the pressure. The spool 170 will then due to the pressure spring 171 immediately return to its left-hand end position thereby venting the conduits 121 and 122 through the discharge conduit 172 and thereby also venting the pressure chamber at the brake control piston 107 and also venting the cylinder pressure chamber 124. As a result thereof, the exhaust pipe brake becomes ineffective, and the motor receives the fuel charge corresponding to idling operation. This control is effected independently of the respective position of the manually operable brake lever 163. The pressure in the cylinder chamber 140 at the transmission control piston 141 will be released only very slowly through the conduits 167, 166 and 143 inasmuch as now the check valve 168 remains closed, and only the bleeder opening 173 having a small cross section and adjustable by a throttling screw or the like (not shown) is available for the discharge of the pressure fluid. The final return shifting of the fluid transmission to the lower torque converter working range is effected only sometime after the exhaust pipe brake has been made ineffective. In this way a killing of the engine is likewise prevented.

The bleeder opening 173 would by itself delay any shifting of the transmission from the upper to the lower velocity range, even when the exhaust pipe brake is not made effective and a delay in the shifting operation is not only not required but would even be advantageous. Therefore, in conformity with the present invention there is provided a bypass conduit 174 which bypasses the bleeder opening 173 and is controlled by a valve spool 175. The pressure chamber 176 at said valve spool communicates through a conduit 177 with the control conduit 121' of the exhaust pipe brake so that the spool 175 will be held in its illustrated closing position only when exhaust pipe braking is effected (brake lever 163 occupying position B). When the exhaust pipe brake is not effective, i.e. when the brake lever 163 is in its dot-dash line position O, no pressure prevails in the conduit 177, and the valve spool 175 occupies its right-hnad end position in which the bypass conduit 174 is released. The delaying device 173, 168 is then ineffective.

Figure 4:
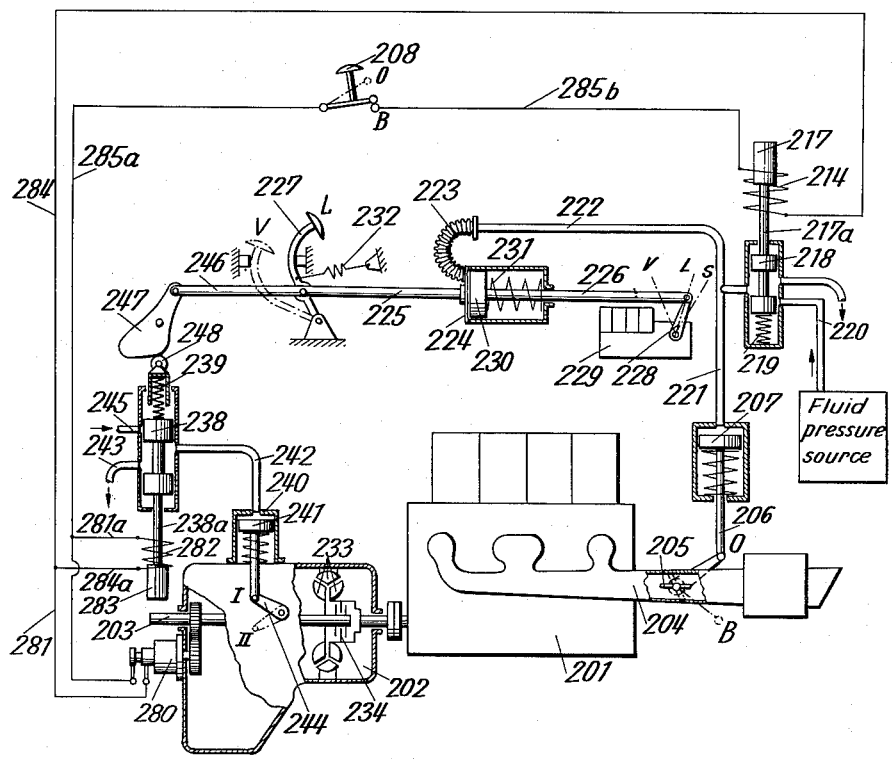
FIG. 4 illustrates an arrangement which differs from that of FIG. 1 primarily in that it includes an electrically controlled measuring generator and an electrically controlled valve spool.

FIG. 4 illustrates a further modification of a braking arrangement according to the present invention in which the elements which correspond to the elements 1 to 48 of FIG. 1 have been designated with the numerals 201 to 248. The arrangement according to FIG. 4 differs from that of FIG. 1 primarily in that measuring pump 35 of FIG. 1 has been replaced by an electric measuring generator 280 which is driven by a transmission output shaft 203. The measuring generator 280 produces an electric voltage which is proportional to the speed of shaft 203. The generator 280 is connected through conduits 281, 281a and 284 and 284a with a magnetic coil 282 the magnetic core 283 of which is rigidly connected by means of a rod 238a with a valve spool 238. The conduit 284 and the conduits 285a and 285b are adapted by means of switch 208 to close the circuit for the magnetic core 217 which by means of a rod 217a is connected to a valve spool 218. The switch 208 represents a manually or foot operable electric braking switch. It will thus be evident that by actuation of switch 208 the circuit for coil 214 may selectively be interrupted, namely when the switch 208 occupies its position O, or it may be closed, namely when the switch 208 occupies the braking position B.

The magnetic coil 282 and spring 239 continuously urging the spool 238 downwardly, are so dimensioned that when the accelerator 227 occupies its idling position designated by the letter L, and when the electric generator 208 reaches a voltage which corresponds to the driving speed $V_1$ of FIG. 2, the magnetic core 283 will against the thrust of spring 239 be pulled into the magnetic core 282 whereby the valve spool 238 is moved upwardly so that the outlet 243 is closed and the pressure fluid outlet 245 is opened. As a result thereof, the transmission is shifted from its low velocity stage with torque converter to the upper purely mechanical velocity stage with friction clutch. This represents the idling speed shift-over point of the transmission.

As soon as the braking switch or braking pedal 208 has been moved into its braking position B, the generator current also energizes the magnetic coil 214. The coil 214 and spring 219 which latter continuously urges the valve spool 218 upwardly, are so designed that only when a generator voltage corresponding to or higher than the driving speed $W_3$ has been reached, the magnetic core 214 is pulled downwardly against the thrust of spring 219 so that the valve spool 218 is moved into its lowermost position. When this occurs, the exhaust brake is made effective. On the other hand, at driving speed below $W_3$, the voltage of the measuring generator 280 is always so low that even when the braking switch or pedal 208 is moved into its position B, the valve spool 218 will remain in its upper position. In this way, it is likewise assured that the exhaust brake can never be made effective or never remain effective when the driving speed drops below $W_3$. This will safely prevent a killing of the motor.

It is, of course, understood that the present invention is, by no means, limited to the particular constructions shown in the drawings but also comprises any modifications within the scope of the appended claims.

What we claim is:

1. In combination with an internal combustion engine having a power transmission including a lower velocity range with a hydraulic torque converter, an upper velocity range with power transmitting means capable of transmitting power both from and to the said engine, and transmission control means for shifting over from said upper velocity range to said lower velocity range and vice versa, a brake system which includes: an exhaust manifold forming part of said engine, a throttle arranged in said exhaust manifold and movable selectively into an open position to make said throttle ineffective or into a closing position for braking said engine, and automatic control means operatively responsive to said transmission control means and operatively connected to said throttle for holding said throttle in its open position when said lower velocity range of the transmission is engaged.

2. An arrangement according to claim 1, which includes automatic control means for automatically shifting over from said upper velocity range to said lower velocity range and vice versa, said automatic control means comprising means for maintaining said throttle in said open position below an output speed of said power transmission higher than the transmission shift-over speed with idling engine.

3. In combination with an internal combustion engine having a power transmission including an output shaft and also including a lower velocity range with a hydraulic torque converter and an upper velocity range with power transmitting means capable of transmitting power both from and to said engine, and automatic transmission control means for automatically shifting over from said upper velocity range to said lower velocity range and vice versa, a brake system which includes: an exhaust manifold forming part of said engine, a throttle arranged in said exhaust manifold and movable selectively into an open position to make said throttle ineffective or into a closing position for braking said engine, throttle operating means for closing said throttle, fluid pressure operable automatic control means for controlling operation of said throttle, a speed measuring pump drivingly connected to the output shaft of said transmission for creating pressure varying in conformity with the output speed of said power transmission, conduit means conveying the pressure developed by said pump to said fluid operable automatic control means, said fluid pressure operable automatic control means being movable in response to a predetermined pressure created by said pump to move into a first position in which said throttle operating means is effective to close said throttle, and spring means continuously acting upon said fluid pressure operable control means for moving the same to a second position in response to a drop in the fluid pressure on said automatic control means below said predetermined pressure in which position said throttle operating means is ineffective to close said throttle, thereby to maintain said throttle in its open position, said predetermined pressure corresponding to an output speed of said output shaft higher than the shift-over speed from said higher velocity range to said lower velocity range.

4. In combination in an internal combustion engine having a power transmission with an output shaft and including a lower velocity range with a hydraulic torque converter, an upper velocity range with power transmitting means capable of transmitting power both from and to the said engine, and fluid pressure operable transmission control means for controlling the shifting from said upper velocity range to said lower velocity range and vice versa, a brake system which includes: an exhaust manifold forming part of said engine, a throttle arranged in said exhaust manifold and movable selectively into an open position to make said throttle ineffective or into a closing position for braking said engine, fluid pressure operable automatic throttle control means operatively connected to said throttle, a speed measuring pump drivingly connected to said transmission output shaft for creating pressure in conformity with the speed of the transmission output shaft, and conduit means for conveying the pressure developed by said pump to said fluid pressure operable transmission control means for controlling the same and to said fluid operable automatic throttle control means, said automatic throttle control means being movable by fluid pressure lower than a predetermined pressure developed by said pump into a position for causing said throttle to move to its ineffective position, said predetermined pressure corresponding to an output speed of said output shaft higher than the shift-over speed from said higher velocity range to said lower velocity range.

5. In combination with an internal combustion engine having a power transmission with an output shaft and including a lower velocity range with a hydraulic torque converter and also including an upper velocity range with power transmission means capable of transmitting power both from and to the said engine, and automatic transmission control means for automatically shifting over from said upper velocity range to said lower velocity range and vice versa in conformity with the output speed of said power transmission, a brake system which includes: an exhaust manifold forming part of said engine, a throttle arranged in said exhaust manifold and movable selectively into an open position to make said throttle ineffective or into a closing position for braking said engine, first fluid operable control means having a movable member connected to said throttle and continuously urged into position for holding said throttle in open position, valve means arranged for connection with a pressure fluid supply for controlling the supply of pressure fluid to said first operable control means, electric circuit means controlling said valve means, manually operable switch means interposed in said circuit means and adapted selectively to be closed, automatic safety switch means arranged in said circuit means and continuously urged into open position, pressure fluid supply means operatively connected to said output shaft for delivering fluid under pressure in conformity with the driving speed of said output shaft, second fluid operable control means for automatically closing said automatic safety switch means in response to a certain minimum fluid pressure produced by said pressure fluid supply means, said certain minimum predetermined pressure corresponding to an output speed of said output shaft higher than the shift-over speed from said higher velocity range to said lower velocity range, and spring means associated with said safety switch means for moving the same into open position in response to the pressure acting upon said second fluid operable control means dropping below said minimum fluid pressure.

6. In combination in an internal combustion engine having a power transmission including a lower velocity range with a hydraulic torque converter and also including an upper velocity range with power transmitting means capable of transmitting power both from and to said engine, a brake system which includes: an exhaust manifold forming part of said engine, a throttle arranged in said exhaust manifold and movable selectively into an open position to make said throttle ineffective or into a closing position for braking said engine, brake control means operable selectively from a first position into a second position and vice versa, power transfer means operatively connecting said brake control means with said throttle, said power transfer means, when in response to said brake control means occupying said second position, tending to hold said throttle in its closing position, and automatic control means operatively connected to said power transmission for controlling said brake control means, said automatic control means being movable into a first position to cause said brake control means to move said throttle into closing position, said automatic control means also being movable into a second position for initiating movement of said brake control means into position for moving said throttle into open position in response to an output speed of said power transmission higher than the shift-over speed from said upper velocity range to said lower velocity range.

7. In combination in an internal combustion engine having a power transmission including a lower velocity range with a hydraulic torque converter and also including an upper velocity range with power transmitting means capable of transmitting power both from and to said engine, and automatic transmission control means for automatically shifting over from said upper velocity range to said lower velocity range and vice versa in conformity with the output speed of said power transmission, a brake system which includes: an exhaust manifold forming part of said engine, a throttle arranged in said exhaust manifold and movable selectively into an open position to make said throttle ineffective or into a closing position for braking said engine, brake control means operable selectively from a first position into a second position and vice versa, power transfer means operatively connecting said brake control means with said throttle, said power transfer means, when in response to said brake control means occupying said second position, tending to hold said throttle in its braking position, and automatic control means operatively connected to said transmission control means for controlling said brake control means, said automatic control means being movable into a first position to thereby allow said brake control means to move said throttle into braking position, said automatic control means also being movable into a second position for initiating movement of said brake control means into position for moving said throttle into open position in response to an output speed of said power transmission higher than the shift-over speed from said upper velocity range to said lower velocity range.

8. The combination according to claim 1, in which said automatic control means includes electrically operated automatic control means operatively connected to said throttle, a speed measuring generator drivingly connected to the output shaft of said power transmission for creating voltage varying in conformity with the output speed of said power transmission, and conductor means conveying the voltage developed by said generator to said electrically operable automatic control means, said electrically operated automatic control means being adapted in response to a certain voltage created by said generator to bring about movement of said throttle into its open position if at said certain voltage said throttle should occupy its braking position, said voltage corresponding to an output speed of said power transmission not lower than the lowest shift-over point from said higher velocity range to said lower velocity range.

9. The combination according to claim 1, in which said automatic control means includes electrically operated automatic control means operatively connected to said throttle, a speed measuring generator drivingly connected to the output shaft of said power transmission for creating voltage varying in conformity with the output speed of said power transmission, and conductor means conveying the voltage developed by said generator to said transmission control means and also to said electrically operable automatic control means, said electrically operated automatic control means being adapted in response to a certain voltage created by said generator to bring about movement of said throttle into its open position if at said certain voltage said throttle should occupy its braking position, said voltage corresponding to an output speed of said power transmission not lower than the lowest shift-over point from said higher velocity range to said lower velocity range.

10. The combination according to claim 1, in which said transmission control means comprises transmission shifting means and in which there are provided means operatively connecting said automatic control means with said transmission shifting means and operable in response to said transmission shifting means being shifted from said higher velocity range to said lower velocity range to actuate said automatic control means for immediately moving said throttle into its open position, and delaying means interposed between said transmission shifting means and said power transmission for delaying the actual shift-over from said higher velocity to said lower velocity range by a certain short period of time.

11. The combination according to claim 1, in which said transmission control means comprises fluid pressure operable transmission shifting means, and in which there are provided means operatively connecting said automatic control means with said transmission shifting means and operable in response to said transmission shifting means being shifted from said higher velocity range to said lower velocity range to actuate said automatic control means for immediately moving said throttle into its open position, and throttle means associated with said fluid pressure operable transmission shifting means for controlling the escape of fluid therefrom to thereby retard the movement of said transmission shifting means from said higher velocity range to said lower velocity range.

12. An arrangement according to claim 11 which includes fluid bypass means for bypassing said throttle means, and means for making said bypass means ineffective in response to said throttle occupying its braking position.

References Cited in the file of this patent

UNITED STATES PATENTS

| | | |
|---|---|---|
| 1,940,712 | Ertz | Dec. 26, 1933 |
| 2,120,896 | Koeppen et al. | June 14, 1938 |
| 2,168,232 | Messinger | Aug. 1, 1939 |

FOREIGN PATENTS

| | | |
|---|---|---|
| 529,668 | Germany | July 16, 1931 |
| 162,899 | Australia | May 17, 1955 |